June 12, 1951 E. MENZEL 2,556,818
AUTOMATICALLY OPERATING UNIVERSAL HYDRAULIC PRESS
FOR THE MOLDING OF THERMOSETTING PLASTICS
Filed May 20, 1947 4 Sheets-Sheet 1
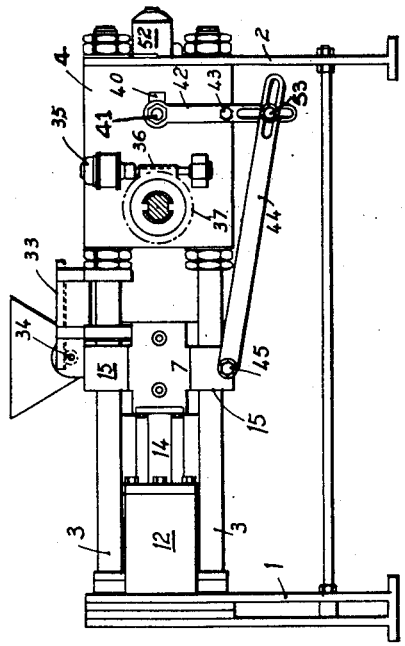
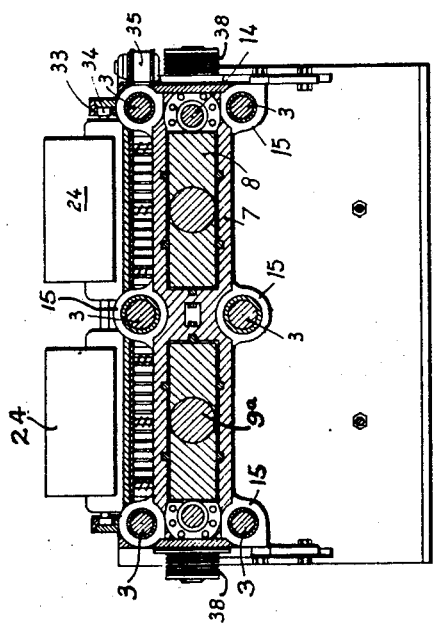
INVENTOR
ERICH MENZEL,
BY
ATTORNEY

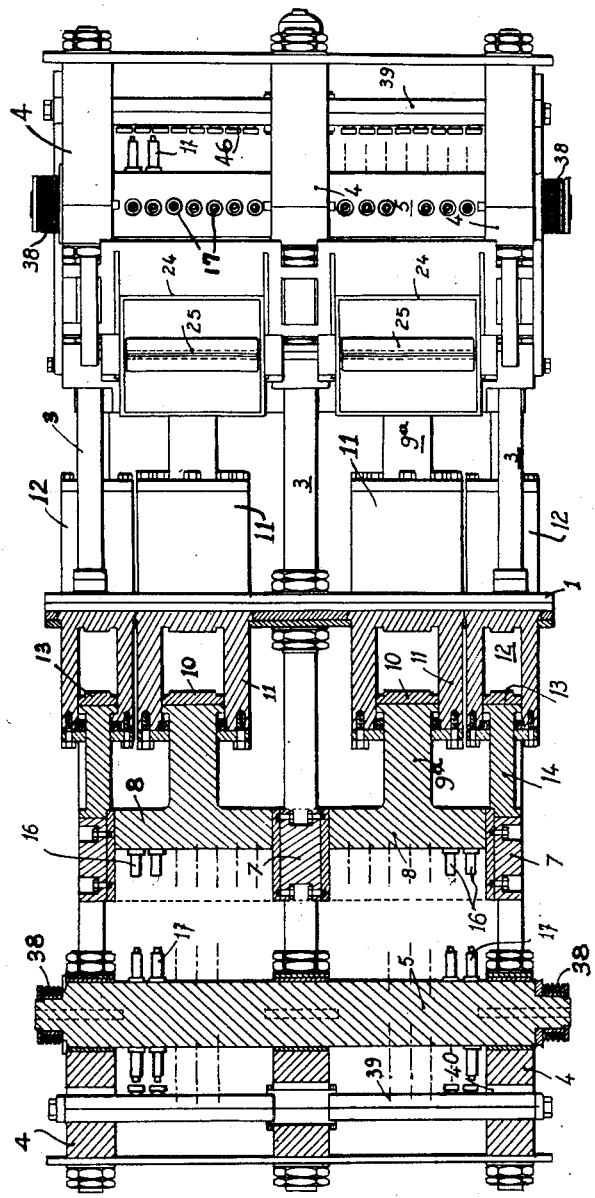

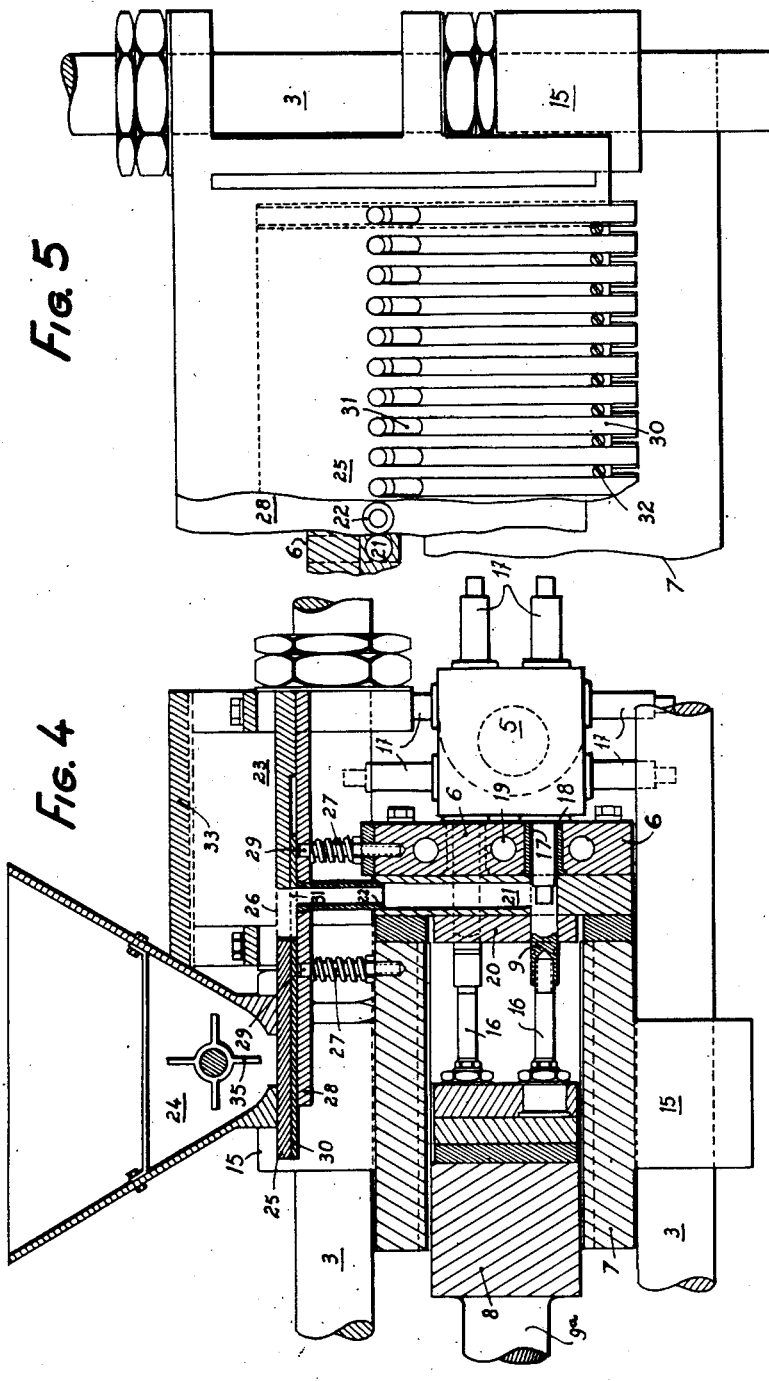

June 12, 1951 E. MENZEL 2,556,818
AUTOMATICALLY OPERATING UNIVERSAL HYDRAULIC PRESS
FOR THE MOLDING OF THERMOSETTING PLASTICS
Filed May 20, 1947 4 Sheets-Sheet 4
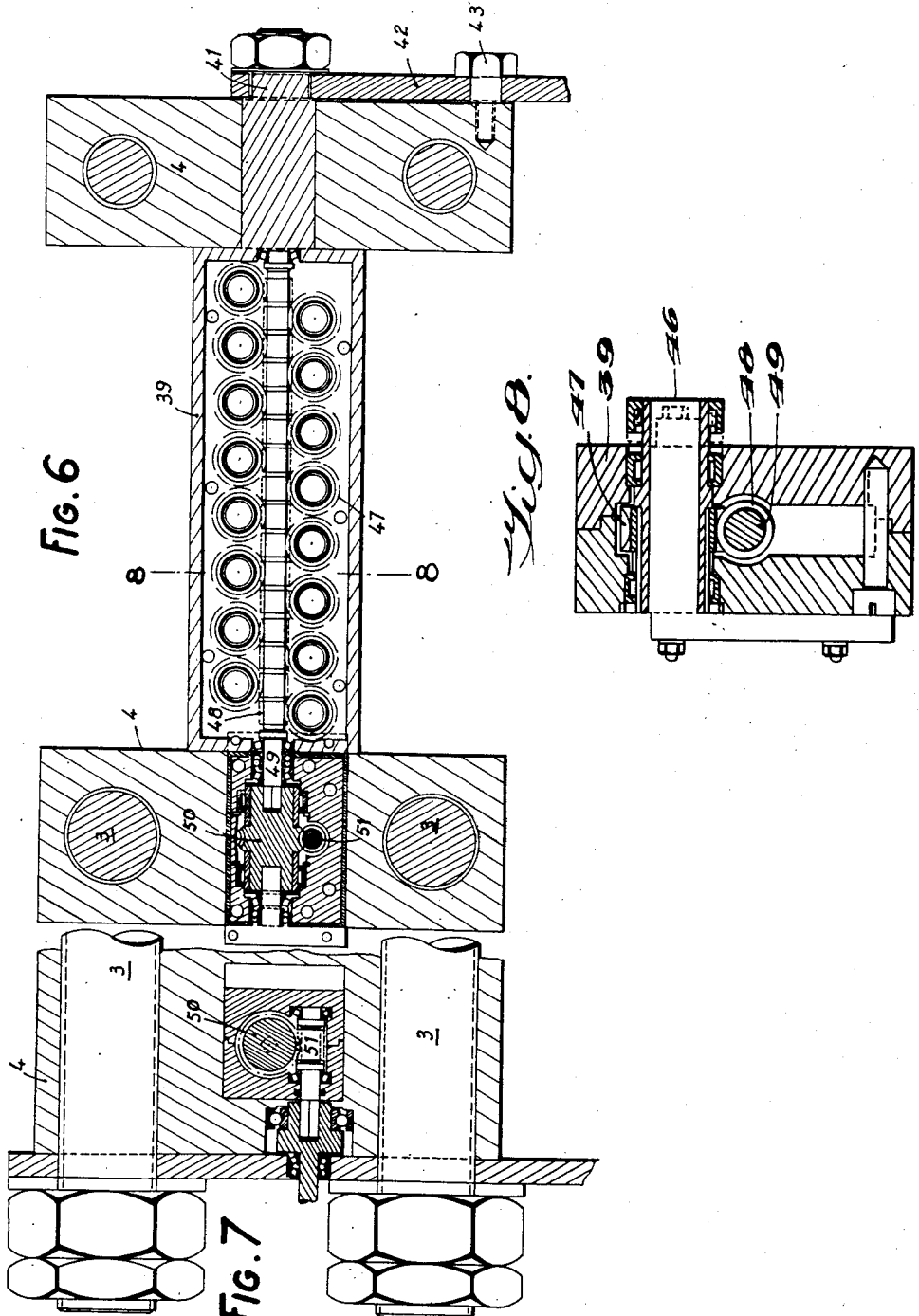
INVENTOR
ERICH MENZEL
BY George P. Clark
ATTORNEY Patented June 12, 1951

2,556,818

UNITED STATES PATENT OFFICE 2,556,818

AUTOMATICALLY OPERATING UNIVERSAL HYDRAULIC PRESS FOR THE MOLDING OF THERMOSETTING PLASTICS

Erich Menzel, Paris, France

Application May 20, 1947, Serial No. 749,278
In Switzerland July 11, 1946

2 Claims. (Cl. 18—16)

The present invention relates to apparatus for molding plastic materials.

In a previous application, Serial No. 749,277, filed May 20, 1947, the applicant has described a molding process in which the member which forms the outer surface of the molded article is united with a fixed core which forms the inner surface of the molded article. In the previous application, a movable piston is provided for forcing a thermo-setting plastic material between the walls of the mold member and the core. In discharging the molded article, first the mold member and then the piston were displaced but the finished article remained on the core from which it could be removed manually or by means of a mechanically operated ejector.

The present invention relates to a press which has been devised particularly for the execution of the above-characterized process. The machine forming the subject-matter of the present application may be either of a vertical or a horizontal type and include two similar parallel arranged presses or two parallel groups of two presses each. One of the main features of each of the presses is that a movable member is hydraulically actuated along guideways constituting a frame for the apparatus. The movable part of the apparatus is provided with a detachable mold member having cavities therein. A cross piece is supported for movement on the guide members which form a part of the frame and cores are adapted to be moved so as to enter recesses or mold cavities formed in the mold member. The apparatus includes pistons which are adapted to enter the cavities of the mold for forcing the mold material into the mold cavity and these pistons are hydraulically operated. The plastic material is also heated within the mold cavities.

In the annexed drawings:

Figs. 1, 2 and 3 are respectively an elevational, a side cross section, and a plan view of an embodiment of the press exhibiting the invention.

Figs. 4 and 5 show on a larger scale a vertical cross section of an arrangement for distributing the molding material to the different cavities of the mold, and a plan view of a device for adjusting the amount of material supplied to each mold cavity.

Figs. 6 and 7 show a longitudinal and cross sectional view of one embodiment of the mechanism for automatically unscrewing the molded article when the core is provided with threads.

Fig. 8 is a cross sectional view taken on the line 8—8 of Fig. 6.

The machine represented in Fig. 3 is a combination of two adjacent parallel presses thereby simplifying the frame structure. The four presses thus assembled are similar so that it is sufficient to describe only one of them. A single press may be used as well as two presses arranged in parallel relationship or two presses may be arranged, one aligned with the other. The presses may be arranged horizontally but they might be disposed in upright positions as well.

Each press is constituted by two uprights 1 and 2 (Fig. 1) interconnected by a plurality of horizontal members 3 and by means of bearing blocks 4. A core supporting member 5 is journalled for rotation in the bearing blocks 4. A plurality of cores 17 are mounted on the core supporting member 5 and these cores 17 are adapted to enter cavities in the mold member 6 (Fig. 4). The horizontal members 3 act as guides for a movable bed 7 (Figs. 1 and 2) which in turn insures the guiding of a cross piece 8. A plurality of threaded rods 16 are carried by the cross piece 8 and pistons 9 are adapted to be carried by the ends of the threaded rods 16 (Fig. 4). The pistons 9 are provided for the purpose of urging the thermosetting molding material into the cavities of the mold members 6. The mold member 6 is detachably mounted on the movable bed 7. The cross piece 8 carries a piston rod 9a. A piston 10 is mounted within a cylinder 11 and the piston 10 is connected to the piston rod 9a. The cylinder 11 is secured on the uprights 1 of the frame. A cylinder 12 of smaller diameter is arranged laterally of the cylinder 11. A piston 13 is arranged for reciprocation in the cylinder 12. The piston 13 is connected to the movable bed 7 by means of a piston rod 14. It will be noted from Fig. 3 that two cylinders 12 are provided one at each side of the press. The movable bed 7 is provided with sleeves 15 (Figs. 1 and 2) which embrace the horizontal members 3 so as to support the movable bed and the mold member 6 on the horizontally disposed members 3.

The cross piece 8 is guided in apertures of the movable bed 7 and the cross piece 8 carries the threaded rods 16. The pistons 9 are mounted on the ends of the threaded rods 16, as shown in Fig. 4, so that the pistons 9 are movable into corresponding cavities of the mold member 6. A bushing 18 is provided in each of the mold cavities and the mold member 6 may be heated by the circulation of hot liquid which enters the mold member through the passages or ducts 19. The cores 17 supported by the member 5 are also adapted to enter the cavities of the mold member 6, as shown in Fig. 4.

A guide member 20 is arranged between the mold member 6 and the cross piece 8 for guiding the pistons 9. One or more passages 21 are provided between the guide member 20 and the mold member 6. This passage is in communication with at least one cavity of the mold. The upper end of each of the passages 21 is provided with a tube 22 which terminates at its upper end adjacent a plastic material distributor 23 which includes a storage hopper 24. The distributor mechanism comprises a plate 25 on which the hopper 24 is supported. The plate 25 is provided with apertures 26 which register with the upper ends of the vertical connecting tubes 22. A plate 28 is provided under the plate 25 and the plurality of springs 27 are arranged to urge the plate 28 upwardly. The plate 28 is connected to the mold member 6 by means of a plurality of small column members 29 about which the springs 27 are arranged. The hopper 24 is movable so as to permit the plastic material to be discharged into the apertures 26 and into the tubes 22.

A plurality of parallel grooves which act as guideways for elongated relatively thin bars 30 are provided between the plates 25 and 28. These bars 30 are slidable in the grooves. Each of the bars are provided with a relatively long slot 31 arranged to register with the aperture 26 in the plate 25 of the material distributor mechanism. Thus by moving the bars 30 the cross sectional area of the opening leading into each of the tubes 22 may be adjusted and accordingly vary the amount of material delivered to a cavity of the mold member 6. The bars 30 may be secured in the adjusted positions by means of screws 32, as shown in Fig. 5. This arrangement provides for the delivery of a correct amount of material to the mold cavity. During the various movements of the mold member 6 a rack 33 acts on a pinion 34 (Figs. 1 and 2) operating an agitator 35 in the hopper 24 to assist in removing the mold material from the hopper.

In operation when liquid under pressure is admitted to the cylinders 12, the pistons 13 are moved to the left in Fig. 3 and the mold member 6 is also moved on the horizontal guide members 3. The mold member 6 (not shown in Fig. 3) is shifted toward the core supporting shaft 5 (Fig. 4) and the core 17 enters the corresponding cavities of the mold member 6. Liquid under pressure is then supplied to the cylinders 11 and the pistons 10 are moved to the left in Fig. 3 and the cross member 8 is moved to the right in Fig. 4, thereby moving the pistons 9 into positions closing the cavities of the mold members 6. When the cavities of the mold are thus closed at both ends the material distributing mechanism is moved so that the associated connecting tube 22 is in registry with the aperture 26. The amount of material to be molded then moves downwardly through the tube 22 into the cavity of the mold member 6. After the mold cavity has been filled hydraulic pressure acting on the pistons 10 moves the piston 9 within the cavity of the mold in order to shape the article under pressure. The molded article is removed after the shaping step by moving the elements of the press in opposite directions.

The apparatus may include a device or mechanism for unscrewing the molded article from the cores 17 particularly when threads are shaped on the interior of the molded article. To this end the core supporting member 5 is rotatably mounted in the bearing blocks 4. The rotation of the core supporting member 5 may be obtained by an electric motor 35 and a gearing arrangement which includes a worm 36 driven by the motor 35 in a helical gear 37 suitably connected to the core supporting member 5. The electric motor 35 may be controlled in any suitable manner to provide for rotation of the core supporting member 5. Thus the core supporting shaft 5 may be rotated through 180° to turn the cores 17 with the molded articles thereon to a position adjacent a removing mechanism as represented by the elongated box 39 in Fig. 3.

The mechanism for removing the finished articles from the cores 17 as represented by the elongated box 39 is mounted in openings in the bearing blocks 4 and these openings are in the form of slots 40 as shown in Figs. 1 and 3. The elongated box 39 may be moved horizontally in the slots 40 by means of a lever 42 connected at its upper end to one end of the box 39 as indicated at 41 in Fig. 1. The lever 42 is pivotally mounted on the bearing block 4 by means of a pivot member 43. A slot is provided in the lower end of the lever 42. A bar 44 is pivotally connected to the movable bed 7 and specifically to one of the sleeves 15 by means of a pivot member 45. The bar 44 is provided with a slot at its opposite end and this end of the bar is connected to the lever 42 by means of a pivot member 53. Thus the box 39 carrying the mechanism for removing the finished articles from the cores 17 may be moved towards the finished articles by movement of the movable bed member 7.

The unthreading mechanism for the finished articles includes a cup-shaped member 46 for spanning or receiving the molded article therein. One of these spanner elements is provided for each of the cores 17, as shown in Fig. 3. The cup-shaped members 46 are each provided with a gear wheel 47 which meshes with worm gears 48 carried by a shaft 49. The shaft 49 is in turn driven by a worm gear 50 in mesh with the worm of a shaft 51. The shaft 51 is driven by an electric motor 52 (Fig. 1).

The ends of the core supporting shaft 5 are provided with slip rings 38 so that electrical energy may be supplied to a heater arrangement (not shown) for heating the cores.

While the invention has been described with reference to particular structural features and with regard to one general organization, it will be appreciated that changes may be made in the elements as well as the arrangement of the parts. Such modification and others may be made without departing from the spirit and scope of the invention as set forth in the appended claims.

What I claim and desire to secure by Letters Patent is:

1. In a press for molding plastic material, a frame including a plurality of guide members, bearing blocks secured to the guide members, a core shaft journalled for rotation in said bearing blocks, cores projecting radially from said core shaft, means for rotating said core shaft, a movable bed mounted for sliding movement on said guide members, a mold member having cavities therein carried by said movable bed with said cavities arranged to receive said cores, a cross piece carried by and slidable relative to the movable bed, pistons carried by the cross piece for cooperation with the cavities in the mold member, means providing a passage in open communication with the cavities of the mold member, a hopper mounted above the mold member, means including slidable bars for controlling movement of plastic material from the hopper to said passage, an elongated member arranged parallel with the core shaft and supported by said bearing blocks, rotatable elements carried by the elongated member for engaging molded articles carried by the cores, means for rotating said elements, and means for moving the elongated member towards and away from the core shaft.

2. In a press for molding thermosetting plastic material, a frame including a plurality of guide members, bearing blocks mounted on the guide members, a core shaft supported for rotation on said bearing blocks, cores radially projecting from said core shaft, means for rotating said core shaft, a movable bed mounted for sliding movement on said guide members, a mold member having cavities therein carried by said movable bed with said cavities arranged to receive said cores, a cross piece slidable relative to the movable bed, pistons carried by the cross piece for cooperation with said cavities, guide means for said pistons, means including slidable bars for delivering measured quantities of plastic material to the cavities of the mold member, an elongated member arranged parallel with the core shaft, rotatable elements carried by the elongated member for engaging molded articles carried by the cores, means for rotating said elements, and means actuated by movements of the movable bed for moving the elongated member towards and away from the core shaft.

ERICH MENZEL.

REFERENCES CITED

The following references are of record in the file of this patent:

UNITED STATES PATENTS

| Number | Name | Date |
|---|---|---|
| 1,849,027 | Pardee | Mar. 8, 1932 |
| 2,327,241 | Berger | Aug. 17, 1934 |
| 2,336,982 | Cremer | Dec. 14, 1943 |
| 2,358,686 | Caron | Sept. 19, 1944 |
| 2,363,808 | Sayre | Nov. 28, 1944 |
| 2,384,163 | Flowers | Sept. 4, 1945 |
| 2,391,527 | Tracy | Dec. 25, 1945 |